US009614669B1

(12) United States Patent
Cox, Jr. et al.

(10) Patent No.: US 9,614,669 B1
(45) Date of Patent: Apr. 4, 2017

(54) SECURE NETWORK COMMUNICATIONS USING HARDWARE SECURITY BARRIERS

(71) Applicants: Jerome R. Cox, Jr., St. Louis, MO (US); Wesley A. Clark, Brooklyn, NY (US); George Engel, Maryville, IL (US); Jeremiah C. O'Driscoll, Maryland Heights, MO (US); David M. Zar, Maryland Heights, MO (US)

(72) Inventors: Jerome R. Cox, Jr., St. Louis, MO (US); Wesley A. Clark, Brooklyn, NY (US); George Engel, Maryville, IL (US); Jeremiah C. O'Driscoll, Maryland Heights, MO (US); David M. Zar, Maryland Heights, MO (US)

(73) Assignee: Q-NET SECURITY, INC., St. Louis, MO (US)

( * ) Notice: Subject to any disclaimer, the term of this patent is extended or adjusted under 35 U.S.C. 154(b) by 0 days.

(21) Appl. No.: 14/944,194

(22) Filed: Nov. 17, 2015

Related U.S. Application Data

(60) Provisional application No. 62/080,906, filed on Nov. 17, 2014, provisional application No. 62/203,546, filed on Aug. 11, 2015.

(51) Int. Cl.
*H04L 29/06* (2006.01)
*H04L 9/08* (2006.01)

(52) U.S. Cl.
CPC ........... *H04L 9/0822* (2013.01); *H04L 9/08* (2013.01); *H04L 9/0861* (2013.01); *H04L 9/0869* (2013.01); *H04L 63/0435* (2013.01)

(58) Field of Classification Search
CPC .................................................. H04L 9/0822
See application file for complete search history.

(56) References Cited

U.S. PATENT DOCUMENTS 6,345,101 B1 * 2/2002 Shukla ................. H04L 9/0625
380/200
8,621,202 B2 12/2013 Mukherjee
(Continued)

FOREIGN PATENT DOCUMENTS

CN         101448256 A  *  6/2009
JP   WO 2012060001 A1  *  5/2012  ............ H04L 9/0869

OTHER PUBLICATIONS

Bharathan, Aarti. Inter-system Authentication Mechanisms for Seamless Roaming in Wireless Environments. Diss. University of Florida, 2003.*
(Continued)

*Primary Examiner* — Shawnchoy Rahman
(74) *Attorney, Agent, or Firm* — The Law Office of Kirk D. Williams

(57) ABSTRACT

One embodiment includes hardware-based cybersecurity devices that create a physical barrier ("hardware security barrier") between a computer's (or other device's) processor and a public or private network. Hardware security barriers typically use immutable hardware in accomplishing cybersecurity activities including generating and distributing cryptographically secure numbers, encryption, decryption, source authentication, and packet integrity verification. This hardware security barrier protects against remote threats and guarantees that all exported and received data are strongly encrypted. A hardware security barrier can be included in any computing or networking device that contains a network interface. One embodiment of a hardware security barrier is implemented as part of a network interface, such as, but not limited to being part of a network interface controller, or as a standalone unit between a communications interface of a host system and a connection to a network.

25 Claims, 11 Drawing Sheets

(56) References Cited

U.S. PATENT DOCUMENTS

| | | | | |
|---|---|---|---|---|
| 2003/0070092 A1* | 4/2003 | Hawkes | ............ | H04L 63/04 726/4 |
| 2006/0184785 A1* | 8/2006 | Challener | ............ | G06F 21/606 713/151 |
| 2008/0016343 A1* | 1/2008 | Holden | ............ | G06F 21/31 713/166 |
| 2010/0161989 A1* | 6/2010 | Kosaki | ............ | H04L 63/061 713/171 |
| 2012/0226905 A1* | 9/2012 | Mohanty | ............ | H04L 9/0825 713/168 |
| 2013/0298182 A1* | 11/2013 | May | ............ | H04L 63/0272 726/1 |
| 2014/0201540 A1* | 7/2014 | Li | ............ | H04L 9/0894 713/193 |
| 2015/0033014 A1* | 1/2015 | McGrew | ............ | H04L 9/30 713/168 |

OTHER PUBLICATIONS

Acar, Tolga, Cédric Fournet, and Dan Shumow. "Cryptographically Verified Design and Implementation of a Distributed Key Manager." (2011).*

David Friedman and David Nagle, "Building Firewalls with Intelligent Network Interface Cards," May 2001, School of Computer Science, Carnegie Mellon University, Pitsburgh, PA (twenty-one pages).

Douglas R. Stinson, Chapter 3: Block Ciphers and the Advanced Encryption Standard, Cryptography Theory and Practice, 2006, Chapman & Hall/CRC, Boca Raton, FL, pp. 73-113.

Douglas R. Stinson, Chapter 4: Cryptographic Hash Functions, Cryptography Theory and Practice, 2006, Chapman & Hall/CRC, Boca Raton, FL, pp. 119-155.

Douglas R. Stinson, Chapter 5, The RSA Cryptosystem and Factoring Integers, Cryptography Theory and Practice, 2006, Chapman & Hall/CRC, Boca Raton, FL, pp. 161-226.

* cited by examiner

SECURE NETWORK COMMUNICATIONS USING HARDWARE SECURITY BARRIERS

CROSS-REFERENCE TO RELATED APPLICATIONS

This application claims the benefit of U.S. Provisional Application No. 62/080,906, filed Nov. 17, 2014, and claims the benefit of U.S. Provisional Application No. 62/203,546, filed Aug. 11, 2015, both of which are hereby incorporated by reference in their entirety.

TECHNICAL FIELD

The present disclosure relates generally to secure network communications using hardware security barriers between network devices; and in particular to hardware-based security performing cybersecurity functions, which may include security key acquisition (e.g., generation), distribution of security keys, encryption, decryption, and authentication of messages communicated between hardware security barriers.

BACKGROUND

Current solutions to the management of security risks on the Worldwide Web/Public Internet have proven to be inadequate. Recent scenarios and breaches have projected economic losses of hundreds of millions of dollars and caused the disclosure of private information essential to many corporations and millions of individuals.

For example, on 8 Jul. 2015, the University of Cambridge Centre for Risk Studies and the Lloyd's of London insurance market outlined an electricity-blackout scenario that would leave 93 million people in New York City and Washington D.C. without power. A likely version of the scenario estimates the impact on the U.S. economy to be $243 billion. However, the most extreme version of the attack could shut down parts of the United States power grid for almost a month and raise long-term legal and environmental issues that could cost as much as $1 trillion to the U.S. economy over a five year time span. These estimates are more than mere speculation because there have been, according to the report, at least 15 suspected cyber-attacks on the U.S. electricity grid since 2000.

A day later, on 9 Jul. 2015, the U.S. Office of Personnel Administration announced that 21.5 million people were swept up in a colossal breach of government computer systems that resulted in the theft of a vast trove of personal information, including Social Security numbers and some fingerprints.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
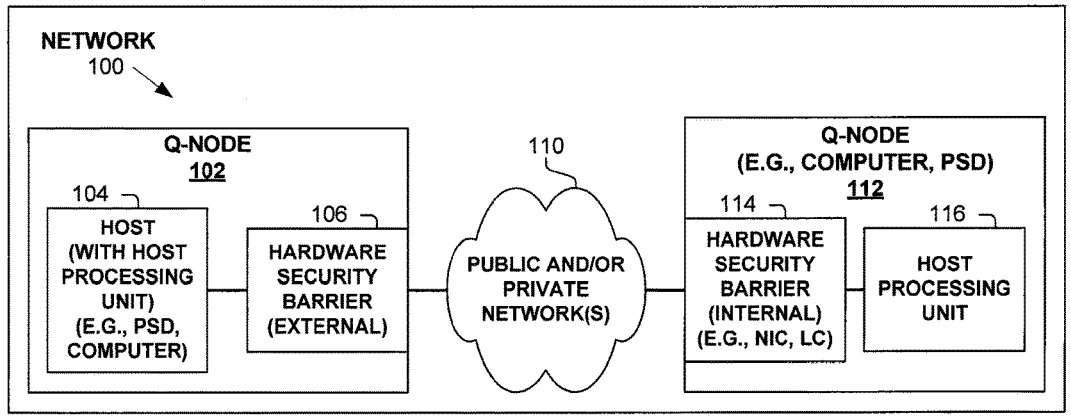
FIG. 1A illustrates a network operating according to one embodiment.

Disclosed are, inter alia, methods, apparatus, mechanisms, and means associated with secure network communications using hardware security barriers. One embodiment comprises a hardware security barrier, a host communications interface communicatively coupled to a host processor unit, and a network interface communicatively coupled to an external network. In one embodiment, the hardware security barrier is implemented in immutable hardware. In one embodiment, the hardware security barrier is implemented as a network interface controller of a networked device. In one embodiment, the hardware security barrier is implemented as a device external to a networked device.

One embodiment includes a method for generating security keys (e.g., cryptographically secure numbers) by a source hardware security barrier and distributing to a destination hardware security barrier. One embodiment includes: generating one or more outgoing security keys by a source hardware security barrier; encrypting based on a particular security key of the one or more outgoing security keys to generate secure key data by the source hardware security barrier; communicating secure key data from the source hardware security barrier to a destination hardware security barrier; and decrypting the security key data based on the particular security key to produce the one or more outgoing security keys by the destination hardware security barrier.

In one embodiment, the generating and encrypting operations are immutable to processing modifications resulting from packets processed by the source hardware security barrier. In one embodiment, the decrypting operation is immutable to processing modifications resulting from packets processed by the destination hardware security barrier.

One embodiment includes a method for communicating information using security keys generated and distributed by a source hardware security barrier to a destination hardware security barrier. One embodiment includes: receiving a particular packet by the source hardware security barrier from a source host; encrypting an original payload of the particular packet based on a particular security key of one or more outgoing security keys resulting in the particular packet having an encrypted payload; communicating the particular packet with the encrypted payload from the source hardware security barrier to the destination hardware security barrier; decrypting the encrypted payload based on the particular security key by the destination hardware security barrier resulting in the particular packet having the original payload; and communicating the particular packet having the original payload from the destination hardware security barrier to a destination host.

In one embodiment, a central authority node (including its own one or more hardware security barriers) provisions and monitors secure connections between hardware security barriers of network nodes. In one embodiment, a hardware barrier of the central authority node is in secure communication with many hardware security barriers. When a first host desires to communicate with a second host, the hardware security barrier of the first host requests the connection from the central security node via a secure connection. If the secure connection between the first and second nodes is authorized, a hardware security barrier of the central authority node securely sends an initial set of security keys (e.g., cryptographically secure numbers) to each of the hardware security barriers of the first and second nodes to initially use. In one embodiment, the central authority node can terminate any one or more secure connections by sending termination messages to corresponding hardware security barriers.

2. Description

Disclosed are, inter alia, methods, apparatus, computer-storage media, mechanisms, and means associated with secure network communications using hardware security barriers. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, apparatus and methods. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Most cybersecurity implementations are software-based and supported by the computer's operating system (OS). The OS has access to program memory and can provide an attacker with many opportunities to corrupt applications or modify the OS itself. OS designers strive to counter these threats, but attackers find new vulnerabilities with each new software release. Furthermore, individuals charged with maintaining system security may not be diligent in keeping system patches current. It only takes one such lapse for an attacker to compromise many networked computers in an essential infrastructure.

Software-based cybersecurity systems have important strengths: They can be deployed on almost any computer system and installation can take place anytime and anywhere that is connected to the Internet. Furthermore, updates and revisions can be easily installed. These advantages have corresponding weaknesses because cryptographic keys are generally accessible by humans and systems can be easily misconfigured in a way that introduces new vulnerabilities. These weaknesses are rooted in human fallibility and can lead to system corruption from malicious software or to the unauthorized export of secret or private information.

The lack of diligence of users or their technical support staff is an important factor in most successful attacks. A report from IBM (IBM Security Services Cyber Security Intelligence Index, July 2013) states that misconfigured systems or applications were at the root of 42% of breaches. End-user errors caused 31% of the breaches. Thus, 73% of the successful attacks on a total of 3,700 IBM clients involved a failure of human diligence or integrity. Clearly, these human errors must be addressed if significant improvement in cybersecurity is to be achieved.

Disclosed are, inter alia, hardware-based cybersecurity devices that create a physical barrier ("hardware security barrier") between a computer's (or other device's) processor and a public or private network. In one embodiment, hardware security barriers use immutable hardware in accomplishing cybersecurity activities including generating and distributing cryptographically secure numbers, encryption, decryption, source authentication, and packet integrity verification. This hardware security barrier protects against remote threats and guarantees that all exported and received data are strongly encrypted. A hardware security barrier can be included in any computing or networking device that is connected to a network, or placed in between the device and its network connection. One embodiment of a hardware security barrier is implemented as part of a network interface, such as, but not limited to being part of a network interface controller, or as a standalone unit between a communications interface of a host system and a connection to a network.

There are important differences in functionality between a standard network node (e.g., computer, smartphone) with a network interface and one embodiment of networked device with a hardware security barrier (referred to as a Q-node). When a standard network interface is used, both trusted and untrusted packets make their way to the processor's memory. Security is then left to the processor operating according to changeable instruction memory supported by its operating system and possibly installed security software running on the program memory. It is the processor's responsibility to distinguish between trusted and untrusted packets. If the operating system is not perfectly sound, an attacker can exploit an operating system weakness and compromise security. Instruction memory can be modified to change the operation of the processor. The operating system and security software may or may not be up to date or correctly installed. Also when security is under control of the processor, packets can leave the processor and be launched on the public network, possibly destined for an untrusted system, which may include security keys, passwords, and any other data accessible to the processor.

In contrast, one embodiment of the hardware security barrier intercepts incoming packets, decrypts them and validates that they have arrived from an authorized source and have not been corrupted in transit. Only the validated packets are forwarded to the host's processor. Furthermore, no confused or malicious user can send a packet to an unauthorized destination or send any unencrypted packet anywhere through the hardware security barrier. One embodiment of a hardware-security-barrier-based cybersecurity system includes features including, but not limited to: no access to or from systems without a hardware security barrier and unauthorized connections between hardware security barriers of different systems; immutability because the functioning of hardware implementation (e.g., silicon, discrete logic, fixed instruction memory) cannot be altered by any remote action; immunity from unintended misconfiguration of network security; security keys are hidden from host systems and humans and are automatically produced and distributed in hardware; and encryption keys are changed continuously, or at least often enough so that no key is ever used longer than some limited number of times, such as, but not limited to once, or more than once but less than such number of times that provides an unacceptable increased risk of discovery by an attacker.

Further, one embodiment of a secure network only allows access to or from systems having a hardware security barrier and authorized connections between hardware security barriers of different systems, thus preventing communications with other systems which could have compromised security. One embodiment only allows communication access to a host system via the hardware security barrier on an authorized connection.

As used herein "immutable" refers to not being subject or susceptible to change in its operating function, but data (e.g., packets, packet payloads, security keys, etc.) on which the operating function is performed varies. One embodiment provides an immutable hardware security barrier through implementation in hardware that includes fixed digital logic and/or a processor whose instruction memory is fixed (e.g., read-only memory). An immutable hardware security barrier will include data storage that can be modified (e.g., for storing packet addresses, security keys, etc.). Also, as used herein a "cryptographically secure number" refers to a true random number, or a pseudorandom number produced by a cryptographically-secure pseudorandom number generator seeded with a true random number. Also, as used herein a "security key" includes, but is not limited to, a cryptographically secure number. Further, as used herein a "network interface controller" (NIC) refers to a network interface implementation in an integrated circuit, and/or on a card or board. For example, a network interface controller including a hardware security barrier can be implemented as, or part, of an integrated circuit chip, on a card or board (which could be part of a motherboard or different card or board), etc.

Each of FIGS. 1A-F illustrates a network including Q-nodes operating according to one embodiment. As used herein, the term "Q-node" refers to a network node (e.g., computer, packet switching device, or other device) that includes an internal or external hardware security barrier for communicating over a network.

As shown in network 100 of FIG. 1A, Q-nodes 102 and 112 securely communicate with each other over public and/or private network(s) 110. FIG. 1A illustrates one embodiment of a Q-node 102 that uses an external hardware security barrier 106 and a Q-node 112 that uses an internal hardware security barrier 114. Q-node 102 includes a host 104 and an external hardware security barrier 106. Host 104 is a device such as, but not limited to, a computer, a packet switching device (PSD) including a network access router or modem, or other network device that includes a host-processing unit (e.g., processor with memory containing instructions and data). Q-node 112 is a host device itself, which includes a host processing unit 116 and internal hardware security barrier 114. External hardware security barrier 106 and internal hardware security barrier 114 provide secure network connections between host 104 and host 112 over public and/or private networks 110.

Figure 1B:
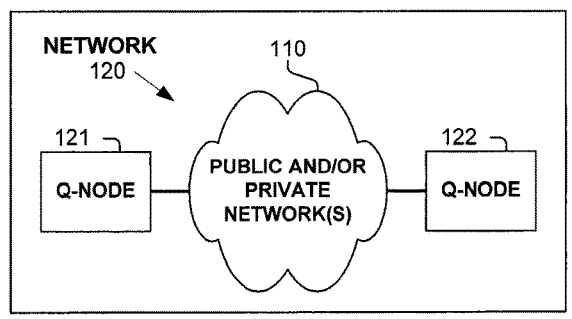
FIG. 1B illustrates a network operating according to one embodiment.
Figure 1C:
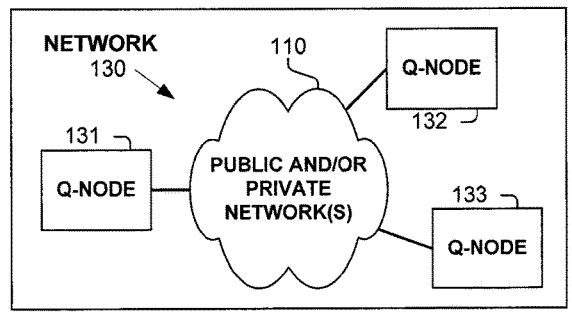
FIG. 1C illustrates a network operating according to one embodiment.

FIGS. 1B and 1C illustrate that Q-nodes, whether using internal or external hardware security barriers, securely communicate over public and/or private networks. FIG. 1B illustrates network 120 including two Q-nodes 121 and 122 securely communicating over network(s) 110. FIG. 1C illustrates network 130 including three Q-nodes 131, 132, and 133 securely communicating among themselves over network(s) 110, including Q-node 131 simultaneously securely communicating with Q-nodes 132 and 133.

Figure 1D:
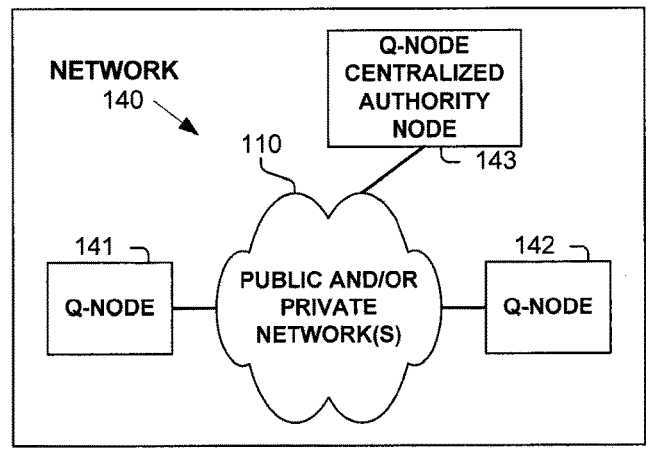
FIG. 1D illustrates a network operating according to one embodiment.

FIG. 1D illustrates a network 140 including three Q-nodes 141, 142, 143, with Q-node 143 being a centralized authority node. Being Q-nodes, all communication between Q-nodes 141, 142, 143 is encrypted. In one embodiment, each of Q-nodes 141 and 142 maintain secure connections (i.e., between hardware security barriers) with Q-node centralized authority node 143. When Q-node 141 wants to establish a secure connection to Q-node 142, Q-node 141 sends a request to Q-node centralized authority node 143.

In one embodiment, Q-node centralized authority node 143 has the ability to authorize or deny (or subsequently cause to be dropped) this requested secure connection. In one embodiment, Q-node centralized authority node 143 logs the request and queries Q-node 142 to see if it will accept the secure connection with Q-node 141. If Q-node 142 is fully utilized or for another reason does not want the secure connection established, Q-node 142 will inform Q-node centralized authority node 143, which will then decline to allow the secure connection to be established, and will log the interaction.

In one embodiment to effectively establish the secure connection, Q-node centralized authority node 143 distributes a set of initial security keys (e.g., cryptographically secure numbers) to both Q-nodes 141 and 142, and logs the interaction. In one embodiment, once this is accomplished, Q-nodes 141 and 142 are free to exchange data and security keys without interaction with Q-node centralized authority node 143.

In one embodiment, if Q-node centralized authority node 143 determines to remove a secure connection or all connections with a particular Q-node, Q-node centralized authority node 143 will cease to establish any connections to or from that particular Q-node. Q-node centralized authority node 143 will also send a message to all Q-nodes currently connected to the particular Q-node instructing them to cease all communication with the particular Q-node. For example, the particular Q-node may present indicia to Q-node centralized authority node 143 or another Q-node that it is untrustworthy, keep-alive messages between the Q-node centralized authority node 143 and the particular Q-node have ceased, a suspect inquiry received by Q-node centralized authority node 143 from the particular Q-node or another node pretending to be the particular Q-node, etc.

In one embodiment, Q-node centralized authority node 143 maintains a record of the operational state of every other Q-node and a list of the identities of the person responsible for each Q-node. Q-node centralized authority node 143 can, at any time, disconnect any Q-node or subnet of Q-nodes. Q-nodes can be located anywhere on a public or private network that the Q-node centralized authority node approves. Traffic moves directly and securely over authorized links between Q-nodes. In one embodiment, all links are managed by a Q-node centralized authority node. In one embodiment, the ultimate responsibility for all management actions including provisioning approved links and monitoring all Q-node activity is entrusted to a Q-node centralized authority node. In one embodiment, a network includes more than one Q-node centralized authority node.

A Q-node (including Q-node centralized authority node) typically maintains a set of backup keys for each other Q-node in which it is authorized to securely communicate for use in reestablishing communications with another corresponding Q-node. The backup keys are used when communications using the standard progression of security keys are exhausted or possibly when secure communications is lost. In one embodiment, each sending Q-node communicates the set of backup security keys to an authorized receiving Q-node.

In one embodiment, initially or possibly in response to no longer having a proper key, a Q-node cannot communicate with a Q-node centralized authority node. A Q-node (including Q-node centralized authority node) will typically then attempt to use one or more of its backup keys to reestablish the lost communications with the other corresponding Q-node. However, these backup keys may become exhausted and communication lost before replenishment. In such case, one embodiment uses a public key scheme, such as, but not limited to RSA, to provide a same set of initial security keys between a Q-node and a Q-node centralized authority node (or in one embodiment, between two Q-nodes).

In one embodiment, each Q-node has a unique serial number (e.g., any unique value) assigned to it. This can be done at manufacture time, or can be done as part of deployment of the Q-node in a network. Each Q-node is also programmed with the network address of a Q-node centralized authority node that it will be associated with for this initialization. The Q-node centralized authority node is provided the Q-node's public key and serial number. Each Q-node will generate a private/public key pair, typically based on a true random number generated, at first power up and will send its unencrypted public key and an initialization request to the Q-node centralized authority node. When the Q-node centralized authority node receives such an initialization request from a Q-node, it replies sending a set of cryptographically secure keys encrypted with the received public key. The Q-node decrypts with its private key. In one embodiment, this private key will not be accessible by anyone outside of the hardware security barrier, so there will be no way to retrieve it by the host processor, the Q-node centralized authority node, nor other hosts on the network.

Figure 1E:
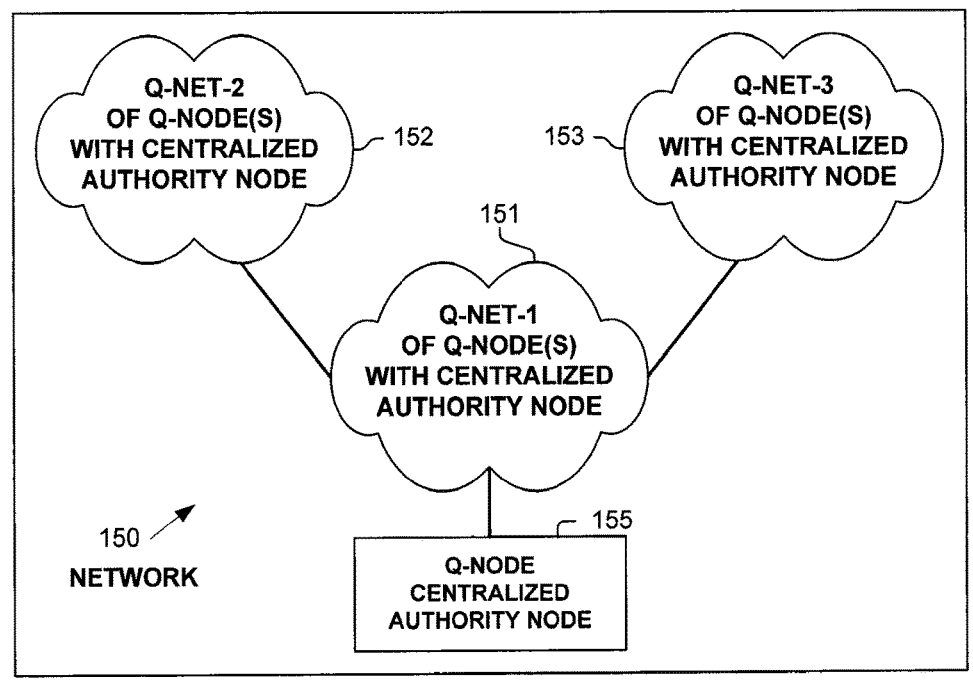
FIG. 1E illustrates a network operating according to one embodiment.

FIG. 1E illustrates network 150 with a hierarchy of Q-nets 151-153 according to one embodiment. As shown, all computers (or other networked devices) in a security-aware organization are Q-nodes in a network called a Q-net. Each Q-net is owned by a single organization that is responsible for its security. That responsibility is manifest in a Q-node centralized authority node for that organization. For example, organizations can be departments within a company, or different companies. In one embodiment, superior in the hierarchy Q-node centralized authority node 155 controls connections for anode of one Q-net 151-153 (or the entire Q-net 151-153) to securely communicate with another node of a different Q-net 151-153 (or the entire different Q-net 151-153).

Figure 1F:
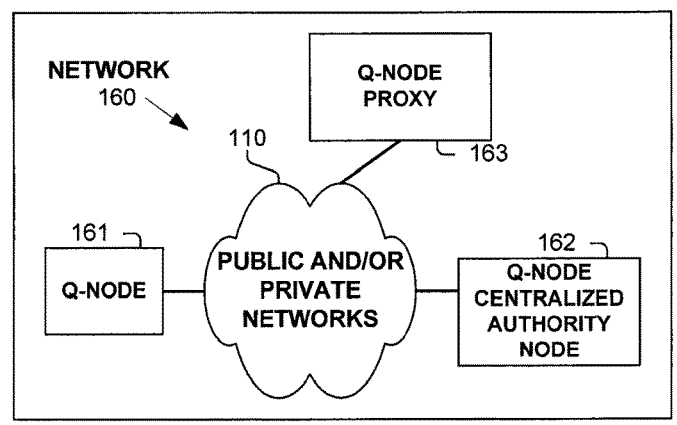
FIG. 1F illustrates a network operating according to one embodiment.

FIG. 1F illustrates network 160 including Q-node 161, Q-node proxy 163, and Q-node centralized authority node 162 which can securely communicate among themselves over public and/or private networks 110. Q-node proxy 163 provides a pathway for Q-node 161 to communicate with other non-Q-nodes. For example, albeit not the best choice for a highest level of security, Q-node 161 may access a non-Q-node website, email server, computer, etc. over its secure connection with Q-node proxy 163 with Q-node proxy 163 communicating with the non-Q-node website, email server, computer, etc.

Figure 2:
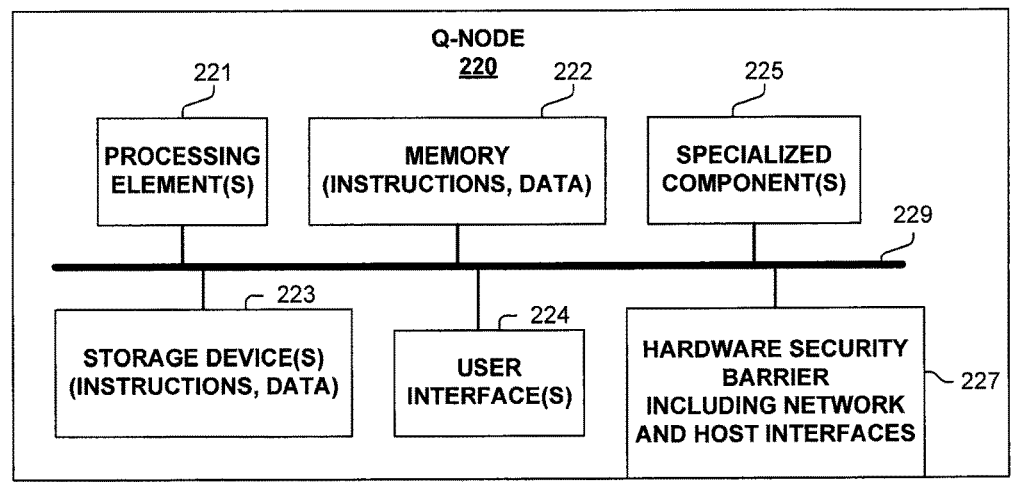
FIG. 2 illustrates an apparatus according to one embodiment.

FIG. 2 is a block diagram of a Q-node 220 used in one embodiment associated with secure network communications using hardware security barriers. In one embodiment, Q-node 220 includes one or more processor(s) 221 (typically with on-chip memory), memory 222, storage device(s) 223, user-interfaces 224 (which may not be part of one embodiment such as a blade server), specialized component(s) 225 (e.g. optimized hardware) and hardware security barrier 227 including a host interface communicatively coupled to communications mechanism 229 and a network interface for communicatively coupling to an external public or private network. One embodiment of Q-node 220 includes more or less elements. In one embodiment, Q-node 220 uses an external hardware security barrier in which case component 227 does not include a hardware security barrier, but includes a host interface communicatively coupled to communications mechanism 229 and network interface or other communications interface such as, but not limited to, a Universal Serial Bus (USB) interface communicatively coupling component 227 to the external hardware security barrier.

Figure 3:
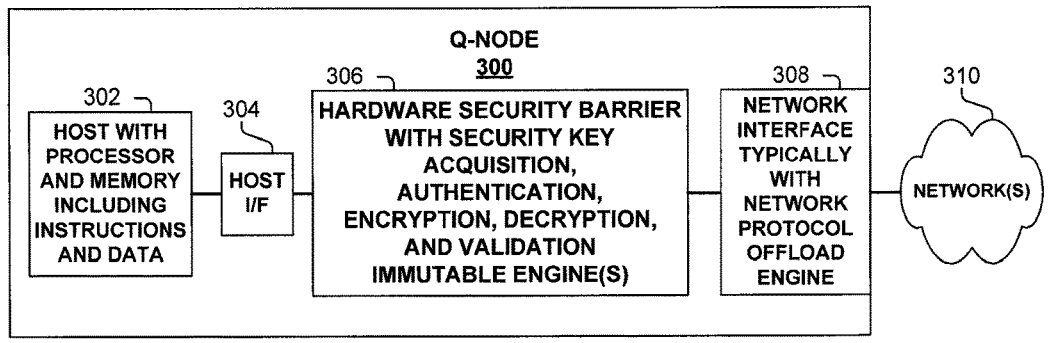
FIG. 3 illustrates a secure node operating according to one embodiment.

FIG. 3 illustrates a Q-node 300 according to one embodiment and connected to network(s) 310. As previously discussed, all Q-nodes include a hardware security barrier. In one embodiment, a hardware security barrier has an immutable dataflow design as it is fixed and cannot be changed without physically replacing the hardware security barrier fixed design (e.g., replacing one or more chips that include fixed instructions). This provides a hardware security barrier that is immutable in the absence of harsh physical access to integral components of the hardware security barrier. In one embodiment, a hardware security barrier performs one or more functions based on modifiable instruction memory.

As shown in FIG. 3, one embodiment of Q-node 300 includes a host 302, host interface 304, hardware security barrier 306, and network interface 308. In one embodiment, Q-node 300 is a host computer with a display, keyboard and a network interface controller includes host interface 304, hardware security barrier 306, and network interface 308 (e.g., as discussed in relation to Q-node 112 of FIG. 1A). In one embodiment, host 302 is a host computer with a display and keyboard, which is connected to an external security device including host interface 304, hardware security barrier 306, and network interface 308 (e.g., as discussed in relation to Q-node 102 of FIG. 1A). In one embodiment, host 302 is a server, packet switching device (e.g., router, network access router or modem) or other networked device (e.g., a device coupled to a network via a hardware security barrier). In one embodiment, host interface 304 is assigned a network address (e.g., Internet Protocol v4 or v6 address, media access control address). In one embodiment, Q-node 300 includes multiple host interfaces 304 for communicating with multiple hosts 302.

In one embodiment, the connection between host 302 and host interface 304 and/or the connection between network interface 308 and network 310 is electrical, optical, wireless, or using another communicatively coupling technology.

In one embodiment, hardware security barrier 306 includes one or more immutable hardware engines performing security key acquisition, authentication, encryption, decryption, and validation processing. In one embodiment, security key acquisition includes hardware security barrier 306 generating the security keys. In one embodiment, these security keys are true random numbers or other cryptographically secure numbers.

In one embodiment, security key acquisition includes retrieving security keys from a fixed memory as, for example, this fixed memory is large enough to store enough security keys for the lifespan of the one embodiment. In one embodiment, security key acquisition includes receiving security keys from a security key generator external to hardware security barrier 306. One embodiment includes a security key generator directly attached to or plugged into a port of hardware security barrier 306.

In one embodiment, host 302 sends and receives packets of a known protocol (e.g., Internet Protocol v4 or v6, Ethernet, Multiprotocol Label Switching) to and from hardware security barrier via host interface 304. Note as used herein, "packets" also refers to "frames" and/or other messages. Hardware security barrier 306 of Q-node 300 provides secure communications to another Q-node on network 310 using network interface 308, which typically includes a network protocol offload engine. Network protocol engines are often used to send, receive, acknowledge received packets, retransmit non-acknowledged packets, etc.

In one embodiment, hardware security barrier 306 is implemented using an immutable integrated circuit core. In other words, the instruction memory or digital logic cannot be modified by a packet received from host 302 or network 310. To update hardware security barrier 306 in one embodiment, the immutable integrated circuit core is physically replaced. In one embodiment, hardware security barrier 306 is implemented using a microcontroller operating according to a fixed set of instructions. In one embodiment, the microcontroller performs authentication, encryption, decryption, and/or validation of a received packet rather than, or in addition to, specialized hardware to perform one or more of these functions.

In one embodiment, each packet transmitted over a Q-Net has a payload of 1024 bytes. Fractional packets are padded to contain a total payload of 1024 bytes. Also, in the one embodiment, security keys (e.g., cryptographically secure numbers) are thirty-two bytes.

Figure 4A:
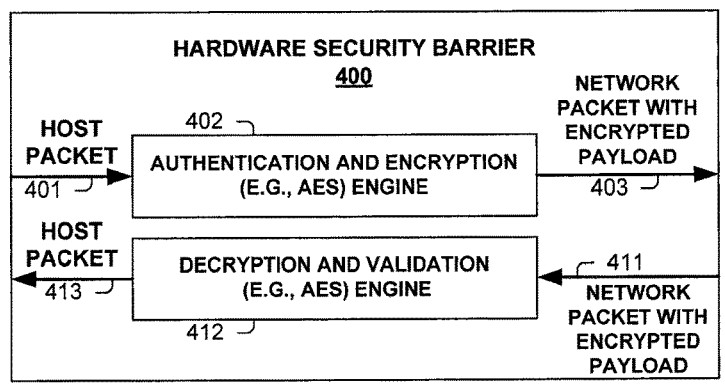
FIG. 4A illustrates a hardware security barrier according to one embodiment.

FIG. 4A illustrates hardware security barrier 400 of one embodiment which uses an authentication and encryption engine 402 and decryption and validation engine 412, each of which, in one embodiment, operate according to a version of the Advanced Encryption Standard (AES), possibly supplemented with an authentication/validation technique if not supported by AES. AES is known to one skilled in the art. As shown, hardware security barrier 400 receives a host packet 401 (from the host such as host 302 of FIG. 3). Authentication and encryption engine 402 processes the packet to produce a network packet with encrypted payload 403 (which is then sent out onto a network). In the reverse direction, a network packet with encrypted payload 411 is received by decryption and validation engine 412, and correspondingly processed producing host packet 413. If the integrity of the host packet 413 is confirmed, then host packet 413 is forwarded to the host, else it is dropped. In one embodiment, hardware security barrier 400 updates a Q-node centralized authority node when a packet is dropped and/or occasionally with performance data.

Figure 4B:
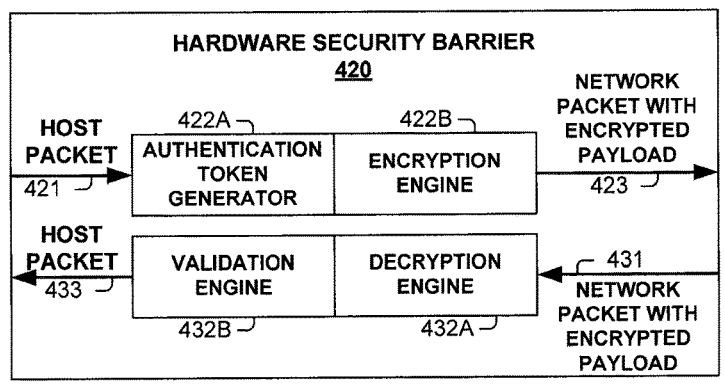
FIG. 4B illustrates a hardware security barrier according to one embodiment.

FIG. 4B illustrates hardware security barrier 420 of one embodiment, which uses an authentication and encryption engine including authentication token generator 422A and encryption engine 422B, and a decryption and validation engine including decryption engine 432A and validation engine 432B. As shown, hardware security barrier 420 receives a host packet 421 (from the host such as host 302 of FIG. 3). Authentication information is added to host packet 421 by authentication token generator 422A, with the result being encrypted by encryption engine 422B producing a network packet with encrypted payload 423 (which is then sent out onto a network). In the reverse direction, a network packet with encrypted payload 431 is received by hardware security barrier 420. The payload is decrypted by decryption engine 432A with the result being processed by validation engine 432B. If the integrity of the host packet 433 is confirmed, then host packet 433 is forwarded to the host, else it is dropped. In one embodiment, hardware security barrier 420 updates a Q-node centralized authority node when a packet is dropped and/or occasionally with performance data.

In one embodiment, a packet payload, designated for transmission by the Q-node, arrives at the hardware security barrier as unencrypted text (plaintext) plus network header information. An authentication token is generated from a digest of the text (ATG). In one embodiment the encryption engine (EE) uses an exclusive OR (XOR) operation to produce encrypted text (ciphertext), which is then shuffled randomly, byte-by-byte (SH), before being transmitted. The protocol offload engine (POE), a hardware subsystem that handles all protocol layers through the transport layer, does packet formatting for transmission over the public network. Each of these steps (ATG, EE, SH, POE) is executed in immutable custom hardware controlled by multiple unalterable state machines.

At the destination after processing by the POE, received packets go through inverse steps in reverse order. First the bytes are sorted to restore their sequential order. Next the ciphertext is decrypted and the source verified. Finally, the integrity of the packet is checked to prevent the acceptance of a packet whose content has been corrupted by an attacker. Any packet from other than a valid source or whose integrity is questioned is discarded. Thus, packets from or modified by an attacker cannot reach the host.

In summary, one embodiment of the hardware security barrier verifies the source and integrity of an incoming message and discards all except valid packets from a Q-node over an authorized connection. Attempts by an attacker to modify a packet or impersonate a Q-node neighbor will fail because it is computationally infeasible for the attacker to forge the authentication tokens inserted in each packet, which is then encrypted for transmission.

In one embodiment, encryption carried out by the hardware security barrier uses symmetric keys only. The probability that any primary or secondary key will be used more than once is vanishingly small and unpredictable. As a result, challenges to the security of a Q-Net by future computation advances, such as quantum computing, will be insignificant. In one embodiment, the hardware security uses asymmetric encryption.

In one embodiment, two 4-byte (32-bit) authentication tokens are generated by the ATG: one carries header information and the other carries a digest of the packet. In one embodiment, the header token is generated first before the digest calculation begins and the generation of the digest token is completed last after the payload has been processed.

In one embodiment, the calculation of the digest token is nonlinear and produces a uniform distribution of tokens (to avoid bit-flipping attacks and to minimized the probability of a lucky guess by an attacker). In one embodiment, the digest calculation takes successive 4-byte words (32 bits) $y_k$ from the input payload and multiplies them together recursively according to the equation:

$$z_k = (y_k + 1) z_{k-1} \mod(p)$$

where $k=0\ldots 255$; $z_0 = 1$; $z_k \in \{1 \ldots p-1\}$; $y_k \in \{0 \ldots 2^{32}-1\}$ and p is a prime between $2^{32}$ and $2^{33}$. It can be proved that each $z_{k-1}$ has a unique $z_k$ for every possible $y_k$ and each $y_k$ has a unique $z_k$ for every possible $z_{k-1}$. As a result, the digest tokens tend to be uniformly distributed 33-bit numbers.

At the destination, the same digest calculation is made on the 4-byte words received in a packet, yielding a second digest token. If the two digest tokens are identical the probability that the packet has been modified in transit is vanishingly small. If the two digest tokens are different, the packet is discarded.

In one embodiment, a conventional XOR between a payload word and a key word, can accomplish the encryption. In one embodiment, another symmetric key encryption such as, but not limited to, Advanced Encryption Standard (AES) is used. Decryption uses the same process and the same key word. The simple hardware XOR of the EE can easily keep pace with any data rate. While this algorithm is extremely simple to implement, it is computationally infeasible to break, due to the fact that each data word is encrypted with its own separate key word.

In one embodiment, a hardware security barrier is supplied with an inexhaustible stream of symmetric-key ciphers generated by a hardware-based true random number generator and/or a hardware-based Pseudorandom Number Generator (PRNG) appropriately seeded with a true random number. In one embodiment, the PRNG is randomly seeded, timed and reconfigured by primary keys from a unique, high-performance TRNG.

The probability that a primary key is repeated in the stream of keys from the TRNG is vanishingly small creating, in effect, a one-time pad. The stream of secondary keys from the PRNG is not truly random, but the probability that a secondary key will be repeated is also vanishingly small. Furthermore, cryptanalysis attacks on secondary keys are thwarted by a combination of frequent and random reinitialization of the PRNG and a random shuffle of all bytes within each packet.

In one embodiment, a hardware security barrier transmits and receives two types of packets: Text Message packets (TxtMsg) and "Just-in-time Key" packets (JitKey). The TxtMsg packets carry all data destined for the user's host computer. From time to time the JitKey packets carry fresh primary keys to the destination. This stream of primary keys comes from the source TRNG and reinitializes both source and destination PRNGs. Since the primary key stream is the same at both source and destination, the two streams of secondary keys are also identical, a necessary condition for correct decryption.

The PRNGs at the source and destination occasionally require a resupply of primary keys. The TRNG at the source passes a set of primary keys to the source PRNG and concurrently generates a JitKey packet to transmit to the destination a copy of the primary keys. This JitKey packet passes through the same token-generation, encryption, decryption and validation steps as a TxtMsg packet. Only valid JitKey packets are allowed to restock the destination primary key supply. Because primary keys at the source and destination remain in step, the secondary keys generated by the two PRNGs do also. The rate of delivery of the primary keys is multiplied by the PRNG, both at the source and the destination. The secondary keys used for decryption are thus provided to the destination with overhead of only a few percent.

In one embodiment, the packets generated by the ATG are encrypted by the EE, but the two authentication tokens, always placed in the first and last word locations, are a vulnerability that an attacker might exploit by focusing on these two locations. Furthermore, the sequence of secondary keys is deterministic and can be exposed if the attacker knows the seed, configuration and timing of the PRNG. Algorithms exist for determining the PRNG state from a sequence of secondary keys obtained from knowledge of the corresponding cleartext. It would be necessary to sequence through the allowable configurations and timing alternatives, but a successful attack is not unreasonable.

To counter such an attack, one embodiment executes a random shuffle of the bytes in a packet. For each packet this shuffle is based on a single primary 16-byte (128-bit) key from the TRNG. In one embodiment, the key is divided into two parts: multiple, random 3-bit rotates for the bytes of input cipher text; and multiple, random 10-bit addresses to scatter the rotated bytes in a 1024-byte memory Each byte is rotated a random number of bits from 0 to 7 as determined by the 3-bit input to a rotate byte block. In one embodiment a Linear Feedback Shift Register (LFSR) with a random seed produces, in random order, all possible non-zero 10-bit memory addresses in which to store the rotated byte of ciphertext. Once a random byte is stored in location zero, the entire packet has been stored in memory. The POE can read the randomly shuffled packet out and export it to the network.

At the destination the inverse process is executed to restore the packet to its original order for decryption. The primary key for the shuffle is transferred to the destination as described above along with the other primary keys used for the seed, configuration and timing of the PRNG in the EE.

Figure 5:
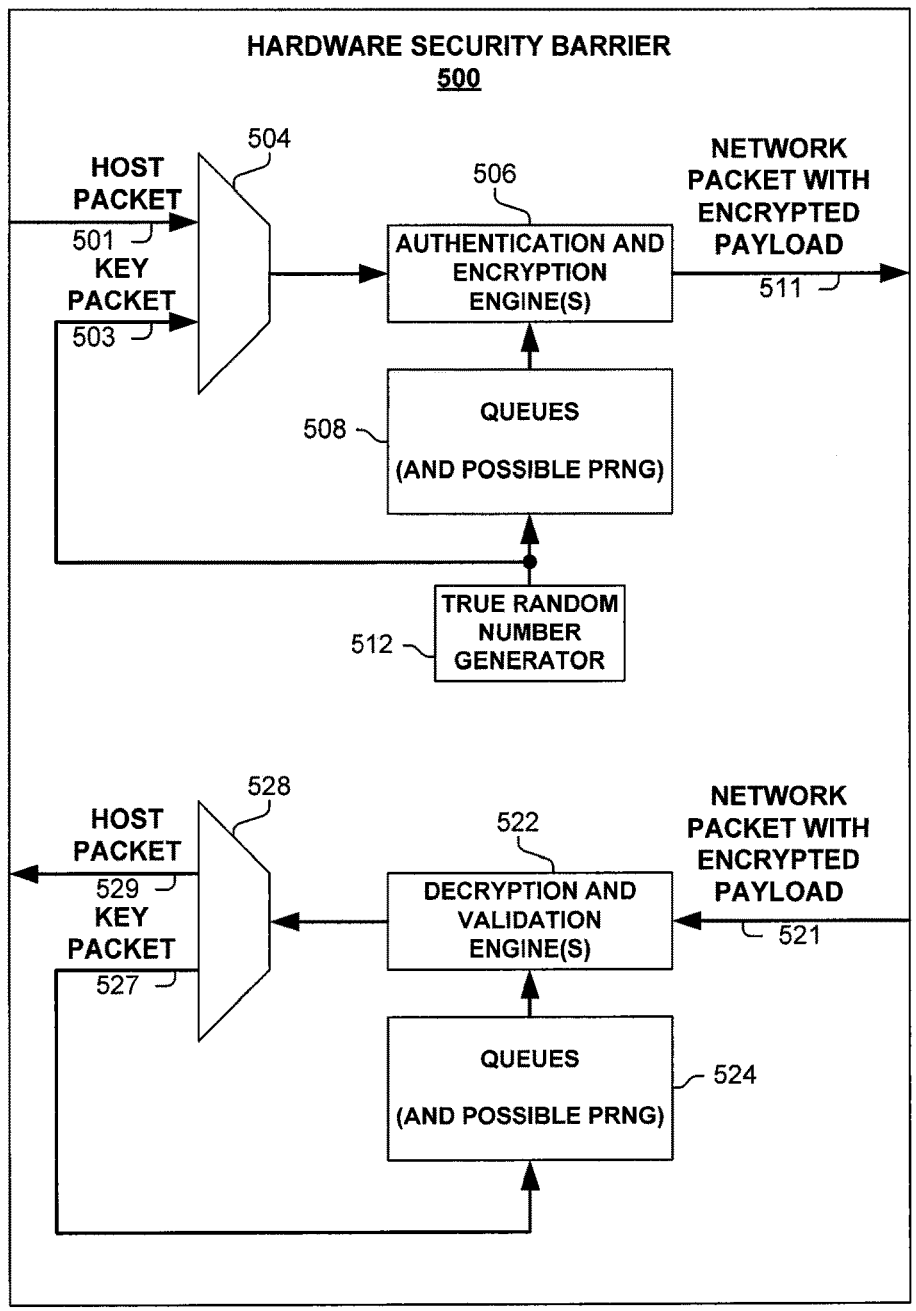
FIG. 5 illustrates a hardware security barrier according to one embodiment.

FIG. 5 illustrates a hardware security barrier according to one embodiment. A source hardware security barrier provides internally generated security keys (e.g., cryptographically secure numbers) to a destination hardware security barrier. The source hardware security barrier subsequently uses these same security keys to encrypt (and possibly authenticate process) host packets to be sent to the destination host including the destination hardware security barrier.

In one embodiment, cryptographically secure numbers generated by a true random number generator are used.

In one embodiment, cryptographically secure numbers generated by a pseudorandom number generator seeded with a generated true random number are used. A pseudorandom number generator of a source and destination hardware security barrier will generate a same stream of cryptographically secure numbers when seeded and configured with the same true random number. Using this technique, a smaller number of true random numbers need to be generated by the source hardware security barrier and communicated to the destination hardware security barrier as a set of more than one cryptographically secure numbers is pseudorandomly generated for each true random number (e.g., generated by a pseudorandom number generator seeded by each true random number).

A source portion of hardware security barrier 500 of one embodiment is shown in the top half of FIG. 5. True random number generator 512 generates multiple cryptographically secure numbers (253 32-bit numbers in one embodiment) which are provided to multiplexer 504 and to queues 508 (which in one embodiment includes a pseudorandom number generator to multiply the number of cryptographically secure numbers used from a single true random number).

Queues 508 receive these cryptographically secure numbers, which are stored in a first-in first-out queue (FIFO) associated with the destination Q-node (and also sent to the destination node). Queues 508 will have a FIFO for each connection to a destination Q-node (including a Q-node centralized authority node) to which it is sending encrypted packets. Authentication and encryption engine(s) use the queued cryptographically secure numbers that were previously communicated to the destination Q-node in encrypting a key packet 503 or host packet 501.

Multiplexor 504 receives a key packet 503 (e.g., JitKey packet) including these cryptographically secure numbers, provides this key packet 503 to authentication and encryption engine(s) 506. Authentication and encryption engine(s) 506 retrieves from queues 508 a cryptographically secure number corresponding to the destination Q-node. Authentication and encryption engine(s) 506 produces a network packet with encrypted payload 511 using the retrieved cryptographically secure number. The network packet with encrypted payload 511 is sent to the destination Q-node.

In another operation, multiplexor 504 receives a host packet 501 (e.g., data packet) from the host of the Q-node, provides this host packet 501 to authentication and encryption engine(s) 506. Authentication and encryption engine(s) 506 retrieves from queues 508 a cryptographically secure number corresponding to the destination Q-node. Authentication and encryption engine(s) 506 produces a network packet with encrypted payload 511 using the retrieved cryptographically secure number. The network packet with encrypted payload 511 is sent to the destination Q-node.

In one embodiment, each packet is encrypted with a different cryptographically secure number retrieved from queues 508. In one embodiment, more than one packet is encrypted using a same cryptographically secure number before retrieving a next cryptographically secure number retrieved from queues 508.

A destination portion of hardware security barrier 500 of one embodiment is shown in the bottom half of FIG. 5. A network packet with encrypted payload 521 is received by decryption and validation engine(s) 522, which retrieves and uses a cryptographically secure number from queues 524 (which in one embodiment includes a pseudorandom number generator to multiply the number of cryptographically secure numbers used beyond the single true random number to seed and configure the PRNG) in the processing of the network packet with encrypted payload 521 to generate a decrypted packet. The decrypted packet is provided to demultiplexor 528 which provides the decrypted packet to the Q-node host if it is a host packet 529, or to queues 524 if it is a key packet 527 (e.g., JitKey packet).

In one embodiment, each packet is decrypted with a different cryptographically secure number retrieved from queues 524. In one embodiment, more than one packet is decrypted using a same cryptographically secure number before retrieving a next cryptographically secure number retrieved from queues 524.

In one embodiment, keys are piggybacked in host packets being communicated from one Q-node to another Q-node. In which case, the key(s) are removed and stored by a destination hardware security barrier from a host packet prior to forwarding the host packet to the host of the Q-node.

Figure 6:
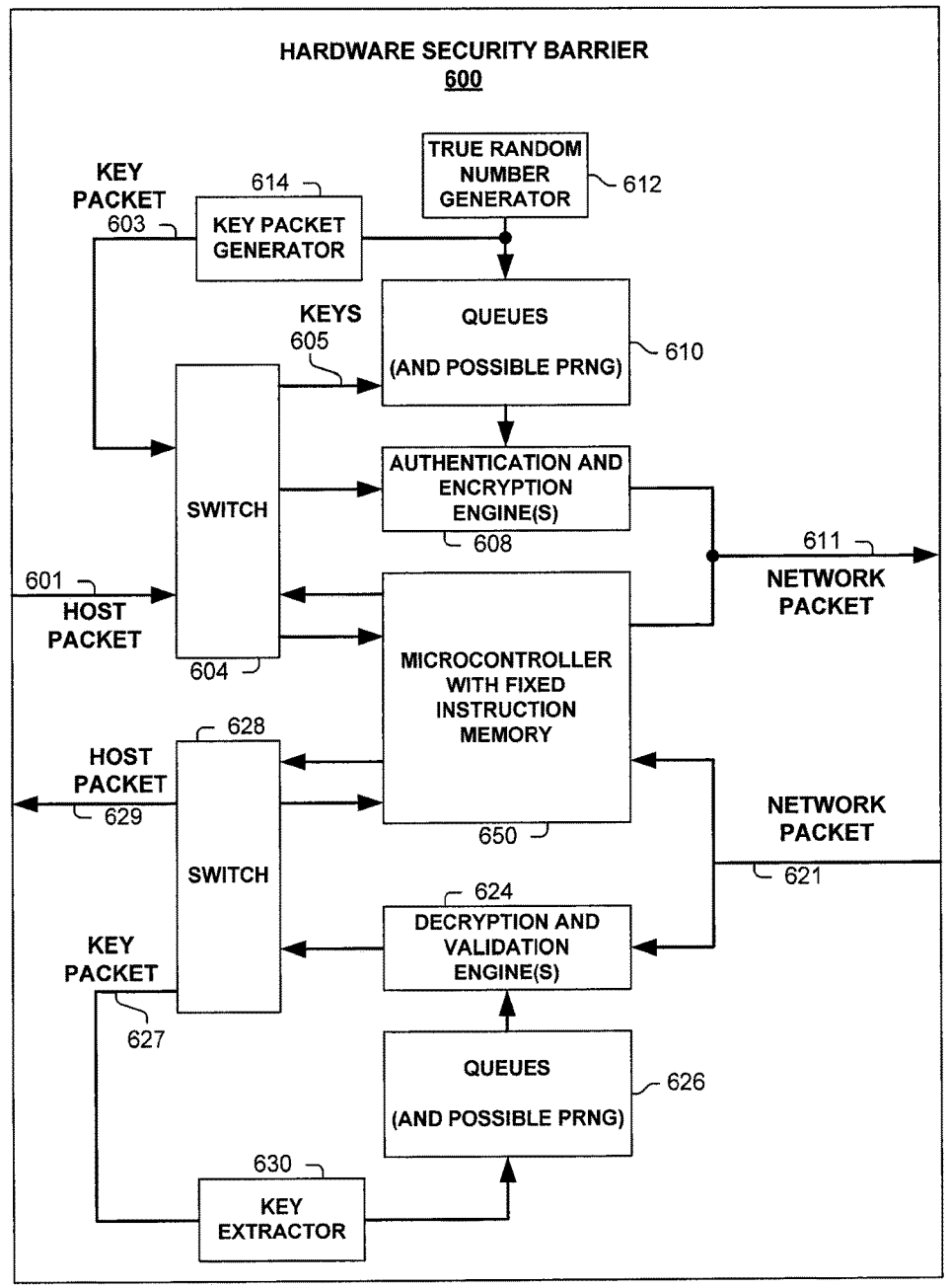
FIG. 6 illustrates a hardware security barrier according to one embodiment.

FIG. 6 illustrates a hardware security barrier 600 according to one embodiment. Hardware security barrier 600 operates very similarly to hardware security barrier 500, so discussion of corresponding elements therein described will not be repeated. Hardware security barrier 600 includes key packet generator 614 (its functionality was included true random number generator 512 of FIG. 5). Hardware security barrier 600 includes key extractor 630 (its functionality was included queues 524 of FIG. 5). Hardware security barrier 600 includes switches 604 and 628 in place of multiplexors 504 and 528 to provide additional paths within hardware security barrier 600.

Hardware security barrier 600 includes microcontroller 650, with some of its functionality inherent in the operations of elements of hardware security barrier 500 of FIG. 5. Microcontroller 650 is immutable as it operates according to its fixed instruction memory which cannot be changed by received host packets 601 or network packets 621. As shown, microcontroller 650 provides explicit communications paths between source and destination portions of hardware security barrier 600. In one embodiment, microcontroller 650 provides cryptographically secure numbers 605 received from a Q-node centralized authority node to queues 610 so that hardware security barrier 600 can communicate with another Q-node. In one embodiment, microcontroller 650 initiates initial communication of hardware security barrier 600 with a Q-node centralized authority node. In one embodiment, microcontroller 650 provides other control functions of hardware security barrier 600. In one embodiment, microcontroller 650 maintains communication with a Q-node centralized authority node by sending and receiving keep-alive messages.

In one embodiment, security keys other than cryptographically secure numbers are generated by hardware security barrier 500 of FIG. 5 and/or hardware security barrier 600 of FIG. 6 and used by their authentication and encryption engine(s) and/or decryption and validation engine(s) in performing their operations (e.g., encrypting, decrypting).

Figure 7A:
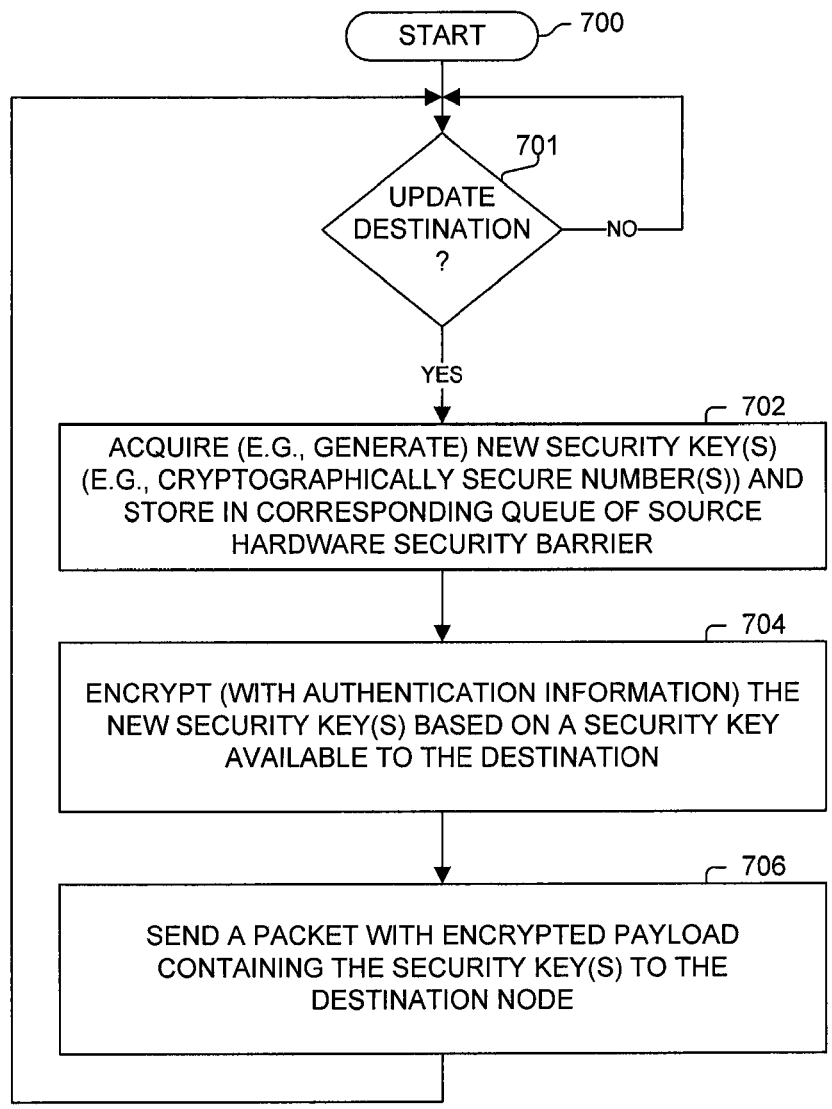
FIG. 7A illustrates a process according to one embodiment.

FIG. 7A illustrates a process performed in one embodiment by source hardware security barrier to update a destination Q-node (including a Q-node centralized authority node) with a new set of security keys (e.g., cryptographically secure numbers). Processing begins with process block 700. Until it is time to send an update, processing remains at process block 701. In one embodiment, key packets (e.g., JitKey packets) are sent at varying intervals so that every nth packet is not a key packet to make it harder for a snooper to recognize JitKey packets.

In response to determining to update the destination Q-node in process block 701, a new set of security keys is generated, and stored in a source node queue for future encrypting of packets being sent to the destination Q-node. In process block 704, the key packet is encrypted (typically with authentication information) based on a security key available at (e.g., previously sent to) the destination Q-node in an encrypted JitKey packet. In process block 706, the encrypted key packet is sent to the destination Q-node. Processing returns to process block 701.

Figure 7B:
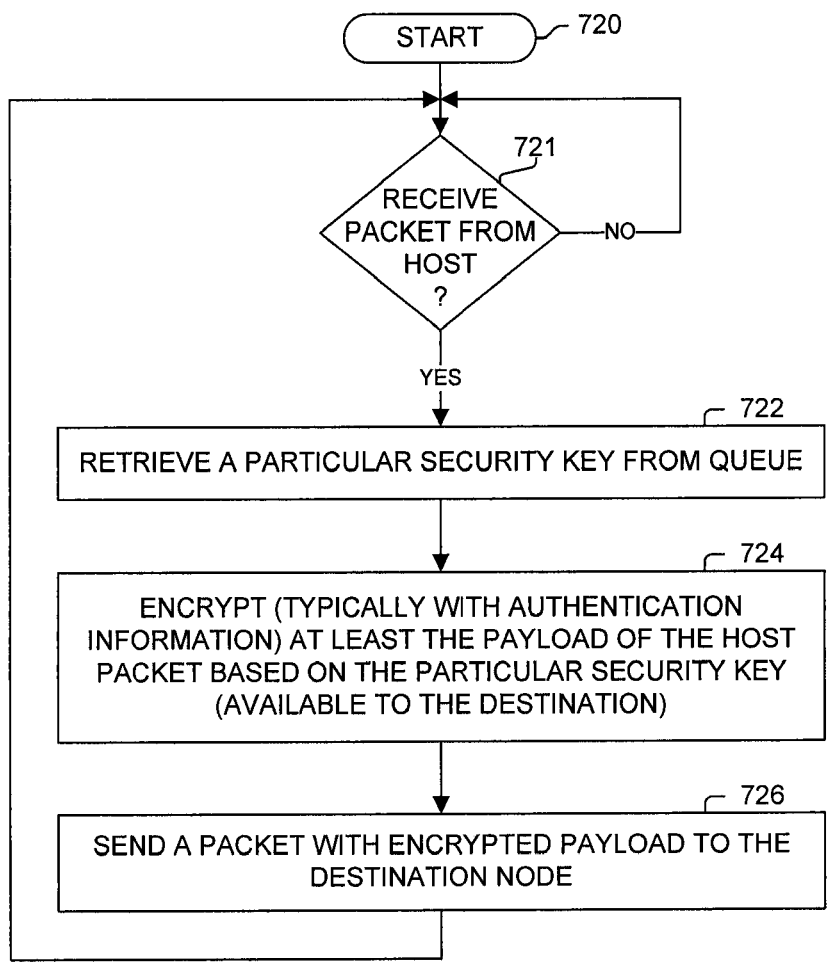
FIG. 7B illustrates a process according to one embodiment.

FIG. 7B illustrates a process performed in one embodiment by source hardware security barrier to send a host packet received from the host of the Q-node to a destination Q-node. Processing begins with process block 720. Until a host packet is received by the source hardware security barrier, processing remains at process block 721.

In response to receiving a host packet by the source hardware security barrier as determined in process block 721, a particular security key (e.g., cryptographically secure number) is retrieved from a queue corresponding to the destination Q-node in process block 722. In process block 724, the host packet is encrypted (typically with authentication information) based on the particular security key available (e.g., previously sent) to the destination Q-node resulting in an encrypted host packet. In process block 726, the encrypted host packet is sent to the destination Q-node. Processing returns to process block 721.

Figure 7C:
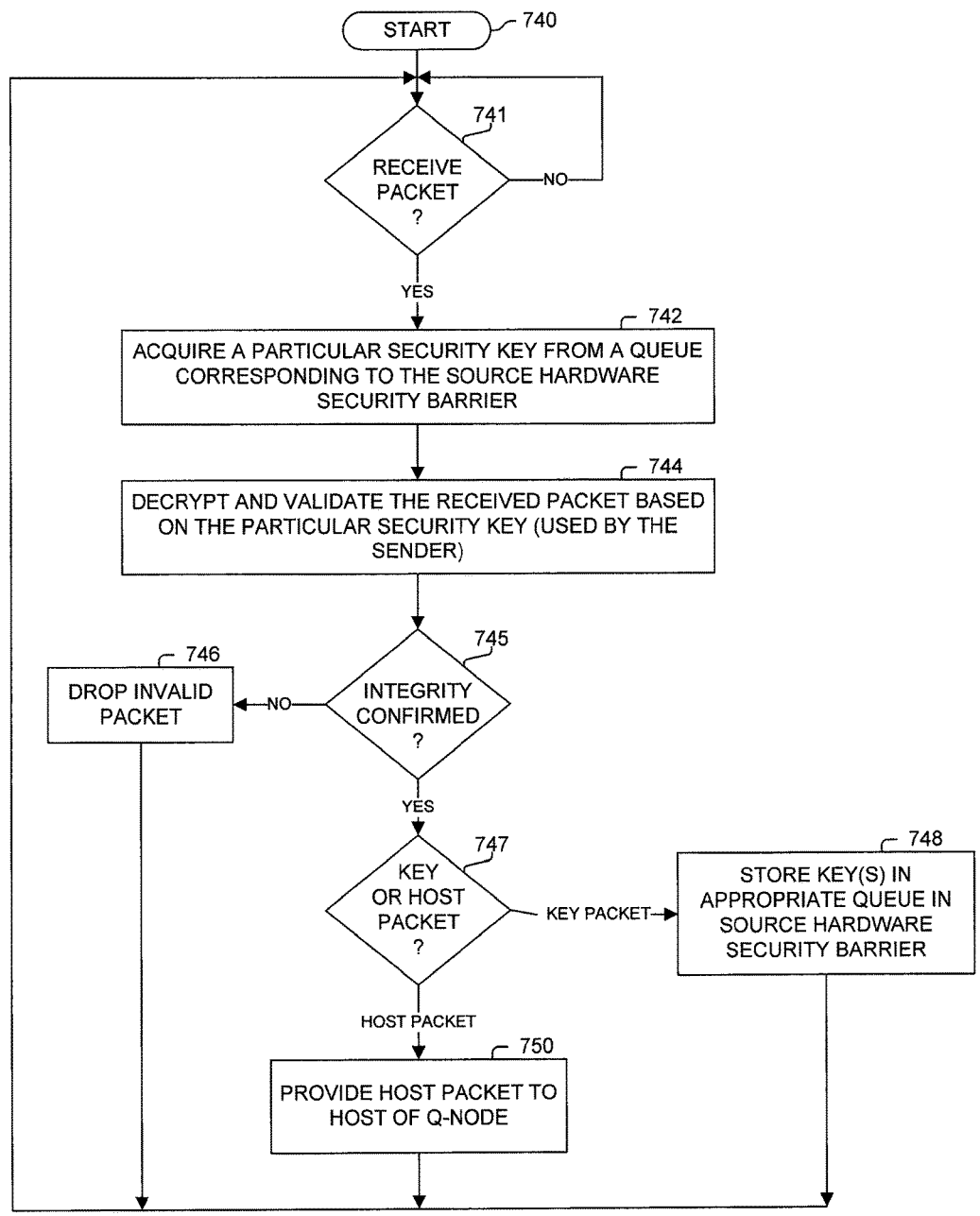
FIG. 7C illustrates a process according to one embodiment.

FIG. 7C illustrates a process performed in one embodiment by destination hardware security barrier receiving a packet from a source hardware security barrier. Until the destination hardware security barrier receives a packet, processing remains at process block 741.

In response to receiving a packet by the destination hardware security barrier of a Q-node from a source hardware security barrier of another Q-node, as determined in process block 741, a particular security key (e.g., cryptographically secure number) is retrieved from a queue corresponding to the source Q-node in process block 742. In process block 744, the payload of the received packet is decrypted (and typically validated based on included authentication information), based on the particular security key received from the source Q-node, resulting in a decrypted packet. As determined in process block 745, if the integrity of the packet is confirmed, then processing proceeds to process block 747, else the packet is dropped in process block 746 (and this action typically logged by the microcontroller, with a notification possibly sent to the Q-node centralized authority node). As determined in process block 747, if the decrypted packet is a key packet (e.g., JitKey packet), the security keys communicated in the payload are stored in the queue corresponding to the source Q-node in process block 748. As determined in process block 747, if the decrypted packet is a host packet, the host packet is provided to the host of the Q-node in process block 750. Processing returns to process block 741.

Figure 8A:
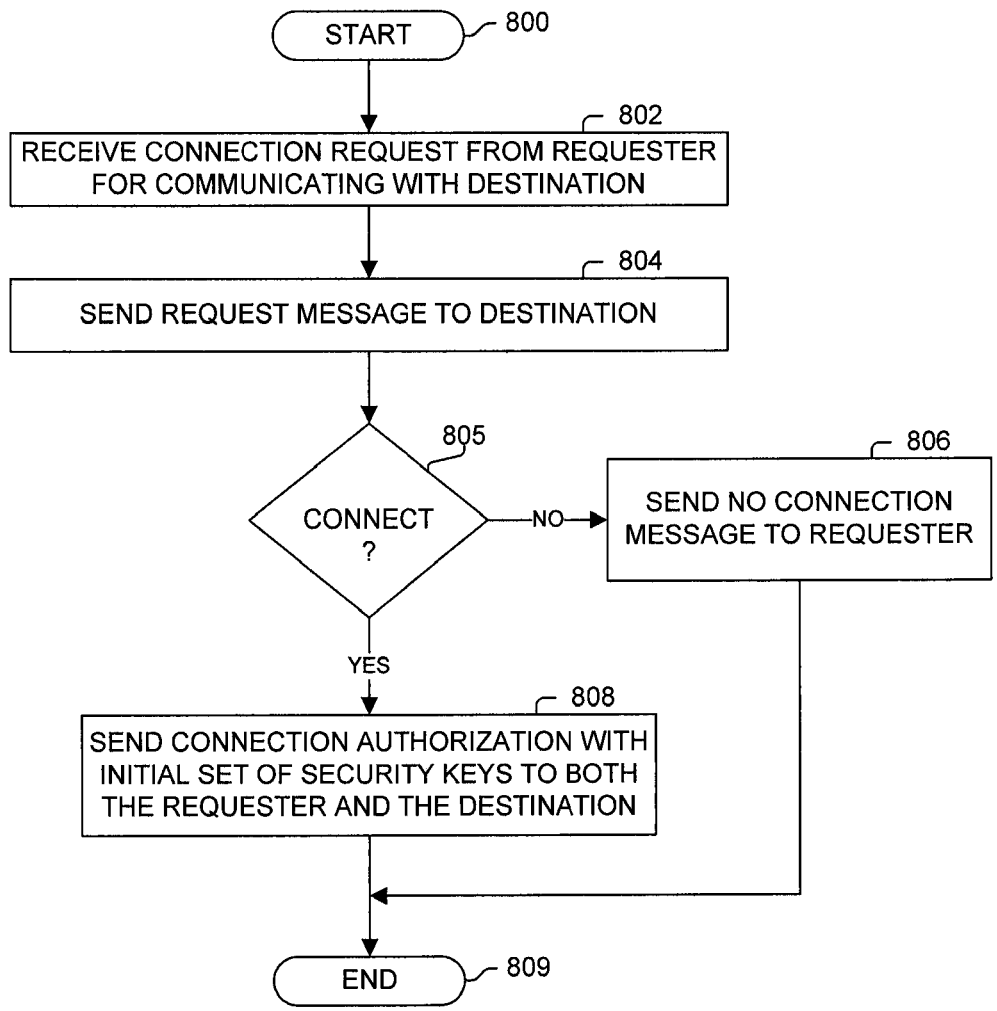
FIG. 8A illustrates a process according to one embodiment.

FIG. 8A illustrates a process performed in one embodiment by a Q-node centralized authority node. Processing begins with process block 800. In process block 802, a communications request is received from a requesting Q-node to communicate with a destination Q-node. In one embodiment, an inquiry to the destination Q-node is made in process block 804. As determined in process block 805, if the connection is allowed (possibly based on information received from the destination Q-node in process block 804), then in process block 808 a connection authorization message with an initial set of security keys (e.g., cryptographically secure numbers) to use for communication is sent to each of the requesting Q-node and the destination Q-node. Otherwise if the connection is not allowed as determined in process block 805, then in process block 806 a denial of the connection is typically sent to the requesting Q-node. Processing of the flow diagram of FIG. 8A is complete as illustrated by process block 809.

Figure 8B:
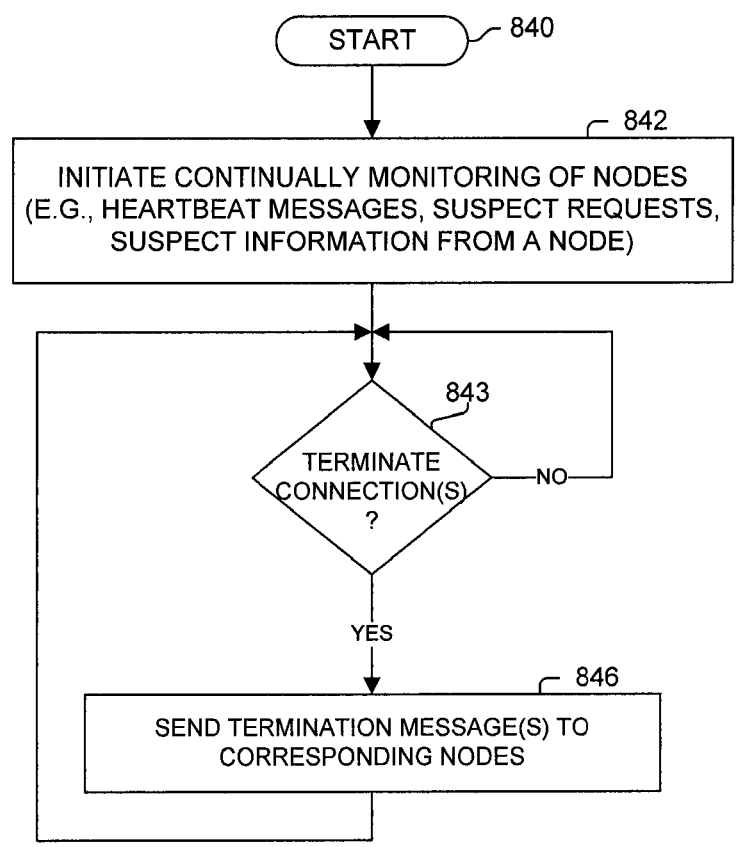
FIG. 8B illustrates a process according to one embodiment.

FIG. 8B illustrates a process performed in one embodiment by a Q-node centralized authority node. Processing begins with process block 840. In process block 842, the Q-node centralized authority node initiates continual monitoring of Q-nodes, which may include, but is not limited to, communicating keep-alive messages with each Q-node, taking note of suspect connection requests, or other suspect information received form a Q-node possibly about another Q-node. The monitoring by the Q-node centralized authority node is continuous.

In response to the monitoring process determining to terminate one or more secure connections between Q-nodes in process block 843, processing proceeds to process block 846 to send messages to one or more Q-nodes to cease communication with one or more specified Q-nodes. Processing returns to process block 843.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    performing operations in a network comprising a source apparatus communicatively coupled to a destination apparatus over an external network;
    wherein the source apparatus includes a source host and a source hardware security barrier, with the source host including a source host processing unit and memory containing instructions and data, with the source hardware security barrier including a source host communications interface and a source network interface coupled to the external network, with the source hardware security barrier providing a physical non-bypassable path in and out of the source apparatus for the source host to communicate with the destination apparatus, with the hardware security barrier disposed between the source host communications interface and source network interface such that all packets must pass through the source hardware security barrier that are communicated between the source host communications interface and the source network interface and between the source host and the source network interface;

wherein the destination apparatus includes a destination host and a destination hardware security barrier, with the destination host including a destination host processing unit and memory containing instructions and data, with the destination hardware security barrier including a destination host communications interface and a destination network interface coupled to the external network, with the destination hardware security barrier providing a physical non-bypassable path in and out of the destination apparatus for the destination host to communicate with the destination apparatus, with the hardware security barrier disposed between the destination host communications interface and destination network interface such that all packets must pass through the destination hardware security barrier that are communicated between the destination host communications interface and the destination network interface and between the destination host and the destination network interface; and where said operations include:

generating one or more outgoing security keys by the source hardware security barrier;

encrypting said one or more outgoing security keys based on a first security key to generate secure key data by the source hardware security barrier;

communicating said secure key data from the source hardware security barrier to the destination hardware security barrier;

decrypting said secure key data based on the first security key to produce said one or more outgoing security keys by the destination hardware security barrier;

receiving a particular packet by the source hardware security barrier from the source host;

encrypting at least a portion of the particular packet based on a particular security key of said one or more outgoing security keys by the source hardware security barrier resulting in a secure packet including an encrypted portion, wherein said encrypting at least a portion of the particular packet based on a particular security key includes pseudorandomly generating a pseudorandom number key by the source hardware security barrier based on the particular security key, and encrypting said at least a portion of the particular packet based on the pseudorandom number key by the source hardware security barrier resulting in the secure packet including an encrypted portion;

communicating the secure packet from the source hardware security barrier to the destination hardware security barrier;

decrypting the encrypted portion of the secure packet based on the particular security key of said one or more outgoing security keys by the destination hardware security barrier resulting in the particular packet, wherein said decrypting the encrypted portion of the secure packet based on the particular security key includes pseudorandomly generating the pseudorandom number key based on the particular security key by the destination hardware security barrier, and decrypting the encrypted portion of the secure packet based on the pseudorandom number key by the destination hardware security barrier resulting in the particular packet; and communicating the particular packet from the destination hardware security barrier to the destination host;

wherein said generating and encrypting operations are immutable to processing modifications resulting from packets processed by the source hardware security barrier and said decrypting operation is immutable to processing modifications resulting from packets processed by the destination hardware security barrier.

2. The method of claim 1, wherein each of said outgoing security keys is a cryptographically secure number.

3. The method of claim 1, wherein said generating and encrypting operations by the source hardware security barrier are performed by one or more source processing elements implemented using a processing element responsive to fixed instruction memory, fixed digital logic, or both a processing element responsive to fixed instruction memory and fixed digital logic; and wherein said decrypting operation is performed by one or more destination processing elements implemented using a processing element responsive to fixed instruction memory, fixed digital logic, or both a processing element responsive to fixed instruction memory and fixed digital logic.

4. The method of claim 1, comprising:
communicating first encryption data from a centralized authority node to the source hardware security barrier;
decrypting said first encryption data to produce the first security key by the source hardware security barrier;
communicating second encryption data from the centralized authority node to the destination hardware security barrier; and
decrypting said second encryption data to produce the first security key by the destination hardware security barrier.

5. The method of claim 1, wherein said at least a portion of the particular packet includes the payload of the particular packet.

6. The method of claim 1, comprising:
communicating first encryption data from a centralized authority node to the source hardware security barrier;
decrypting said first encryption data to produce the first security key by the source hardware security barrier;
communicating second encryption data from the centralized authority node to the destination hardware security barrier; and
decrypting said second encryption data to produce the first security key by the destination hardware security barrier.

7. The method of claim 1, comprising:
encrypting the particular security key by the source hardware security barrier resulting in an encrypted particular security key;
communicating the encrypted particular security key from the source hardware security barrier to the destination hardware security barrier;
decrypting the encrypted particular security key by the destination hardware security barrier resulting in the particular security key.

8. The method of claim 1, wherein each operation of said encrypting said one or more outgoing security keys, said decrypting said secure key data, said encrypting at least a portion of the particular packet, and decrypting the encrypted portion is performed using Advanced Encryption Standard (AES).

9. The method of claim 1, comprising:
including authentication information in the secure packet by the source hardware security barrier; and
authenticating the particular packet by the destination hardware security barrier based on said included authentication information.

10. The method of claim 1, wherein the source host cannot access said one or more outgoing security keys.

11. The method of claim 1, wherein each of said encrypting said one or more outgoing security keys and said encrypting at least a portion of the particular packet is performed using exclusive-OR and shuffle operations; and wherein each of said decrypting said secure key data and decrypting the encrypted portion is performed using sorting and exclusive-OR operations.

12. The method of claim 1, wherein the source apparatus comprises a source network interface controller including the source hardware security barrier, the source host communications interface, and the source network interface.

13. The method of claim 1, wherein the source apparatus comprises an external hardware security barrier including the source hardware security barrier, the source host communications interface, and the source network interface.

14. An apparatus, comprising:
a host processing unit with memory containing instructions and data;
a hardware security barrier, comprising a security key generator coupled to an immutable encryption engine and to an immutable destination-key-packet generation engine, an immutable decryption engine, and a processor with fixed instruction memory;
a host communications interface between the host processing unit and the hardware security barrier;
a network interface configured between the hardware security barrier and an external network;
receiving a particular packet by the hardware security barrier from the host processing unit;
encrypting at least a portion of the particular packet based on a particular security key of one or more outgoing security keys by the hardware security barrier resulting in a secure packet including an encrypted portion, wherein said encrypting at least a portion of the particular packet based on a particular security key includes pseudorandomly generating a pseudorandom number key by the hardware security barrier based on the particular security key, and encrypting said at least a portion of the particular packet based on the pseudorandom number key by the hardware security barrier resulting in the secure packet including an encrypted portion; and
sending the secure packet from the apparatus;
wherein the hardware security barrier provides a physical non-bypassable path in and out of the apparatus for the host processing unit to communicate with one or more devices on the external network, with the hardware security barrier disposed between the host communications interface and the network interface such that all packets must pass through the hardware security barrier that are communicated between the host communications interface and the network interface, between the host processing unit and the network interface, and between said memory and the network interface.

15. The apparatus of claim 14, wherein the hardware security barrier comprises immutable authentication token generator hardware, and immutable authentication token validation hardware.

16. The apparatus of claim 14, wherein the security key generator includes a cryptographically secure number generator.

17. The apparatus of claim 14, wherein the apparatus includes a network interface controller including the hardware security barrier, the host communications interface, and the network interface.

18. The apparatus of claim 14, wherein the apparatus comprises:
a networked node including the host processing unit with memory containing instructions and data, and a second communications interface; and
an external hardware security device including the hardware security barrier, the host communications interface and the network interface; and
wherein the host communications interface is communicatively coupled to the network interface.

19. A method, comprising:
performing operations by an apparatus including a host processing unit with memory containing instructions and data, a hardware security barrier implemented in immutable hardware, a host communications interface communicatively coupled to the host processor unit, and a network interface communicatively coupled to an external network, with the hardware security barrier providing a physical non-bypassable path in and out of the apparatus for the host processing unit to communicate with one or more devices on the external network, with the hardware security barrier disposed between the host communications interface and the network interface such that all packets must pass through the hardware security barrier that are communicated between the host communications interface and the network interface, between the host processing unit and the network interface, and between said memory and the network interface;
wherein said operations include:
decrypting and authentication processing at least a portion of a plurality of packets received on the network interface resulting in a plurality of decrypted packets by the hardware security barrier;
only providing authenticated packets of said decrypted packets to the host processing unit via the host communications interface by the hardware security barrier;
wherein said operations of decrypting, authentication processing, and only providing authenticated packets of said decrypted packets to the host processing unit are immutable to modification resulting from packets received on the network interface;
wherein said decrypting and authentication processing includes decrypting an encrypted portion of a secure packet of the plurality of packets based on a particular security key by the hardware security barrier resulting in a particular packet, wherein said decrypting the encrypted portion of the secure packet based on the particular security key includes pseudorandomly generating a pseudorandom number key based on the particular security key by the hardware security barrier, and decrypting the encrypted portion of the secure packet based on the pseudorandom number key by the hardware security barrier resulting in the particular packet; and wherein said only providing authenticated packets of said decrypted packets to the host processing unit includes providing the particular packet to the host processing unit.

20. The method of claim 19, wherein the apparatus comprises a network interface controller, with the network interface controller including: the hardware security barrier, the host communications interface, and the network interface.

21. An apparatus, comprising:
a host processing unit with memory containing instructions and data; and
a network interface controller including a hardware security barrier,
a host communications interface to communicate with the host processor unit, with the host communications interface communicatively coupled to the hardware security barrier, and
a network interface communicating with an external network, with the network interface communicatively coupled to the hardware security barrier;
wherein the hardware security barrier provides a physical non-bypassable path in and out of the apparatus for the host processing unit to communicate with one or more devices on the external network, with the hardware security barrier disposed between the host communications interface and the network interface such that all packets must pass through the hardware security barrier that are communicated between the host communications interface and the network interface, between the host processing unit and the network interface, and between said memory and the network interface;
wherein the hardware security barrier decrypts secure key data received from a second hardware security barrier on the network interface to produce cryptographically secure numbers; decrypts portions of packets received on the network interface based on said cryptographically secure numbers resulting in decrypted packets, performs authentication processing of said decrypted packets, and only provides authenticated packets of said decrypted packets to the host processing unit via the host communications interface; and
wherein the hardware security barrier is implemented entirely in fixed hardware such that said configurations to decrypt, to perform authentication processing, and to only provide authenticated packets of said decrypted packets to the host processing unit are immutable to processing modifications resulting from said information received on the network interface or host communications interface;
wherein said decrypts portions of packets received on the network interface based on said cryptographically secure numbers resulting in decrypted packets includes decrypting an encrypted portion of a secure packet of said packets based on a particular security key of said cryptographically secure numbers by the hardware security barrier resulting in a particular packet, wherein said decrypting the encrypted portion of the secure packet based on the particular security key includes pseudorandomly generating a pseudorandom number key based on the particular security key by the hardware security barrier, and decrypting the encrypted portion of the secure packet based on the pseudorandom number key by the hardware security barrier resulting in the particular packet; and
wherein said only providing authenticated packets of said decrypted packets to the host processing unit includes providing the particular packet to the host processing unit.

22. The apparatus of claim 21, wherein said fixed hardware consists of at least one more processing element responsive to fixed instruction memory, fixed digital logic, or at least one more processing element responsive to fixed instruction memory and fixed digital logic.

23. The method of claim 1:
wherein said operation of communicating said secure key data from the source hardware security barrier to the destination hardware security barrier includes the destination hardware security barrier receiving said secure key data on the destination network interface;
wherein said operation of decrypting said secure key data produces one or more cryptographically secure numbers;
wherein said one or more cryptographically secure numbers includes the particular security key;
wherein the method includes authentication processing of the particular packet, and only providing an authenticated said particular packet to the destination host via the destination host communications interface by the destination hardware security barrier; and
wherein the destination hardware security barrier is implemented entirely in fixed hardware such that said configurations to decrypt, to perform authentication processing, and to only provide authenticated packets of said decrypted packets to the destination host processing unit are immutable to processing modifications resulting from said information received on the destination network interface or destination host communications interface.

24. The method of claim 1:
wherein the source hardware security barrier comprises a security key generator coupled to an immutable encryption engine and to an immutable destination-key-packet generation engine, an immutable decryption engine, and a processor with fixed instruction memory.

25. The method of claim 1:
wherein said the secure packet is received on the destination network interface;
wherein the method includes authentication processing of the particular packet, and only provided providing an authenticated said particular packet to the destination host via the destination host communications interface by the destination hardware security barrier; and
wherein said operations of decrypting, authentication processing, and only providing authenticated packets of said decrypted packets to the destination host processing unit are immutable to modification resulting from packets received on the destination network interface.

* * * * *